(12) United States Patent
Kakkirala et al.

(10) Patent No.: US 9,368,124 B2
(45) Date of Patent: Jun. 14, 2016

(54) COMPUTER IMPLEMENTED SYSTEM FOR AUDIO WATERMARKING

(71) Applicant: Tata Consultancy Services Ltd., Mumbai, Maharashtra (IN)

(72) Inventors: Krishna Rao Kakkirala, West Godavari (IN); Srinivasa Rao Chalamala, Hyderabad (IN); Bala Mallikarjuna Rao Garlapati, Hyderabad (IN)

(73) Assignee: Tata Consultancy Services Ltd. (IN)

( * ) Notice: Subject to any disclaimer, the term of this patent is extended or adjusted under 35 U.S.C. 154(b) by 8 days.

(21) Appl. No.: 14/564,267

(22) Filed: Dec. 9, 2014

(65) Prior Publication Data

US 2016/0049153 A1   Feb. 18, 2016

(30) Foreign Application Priority Data

Aug. 12, 2014   (IN) .......................... 2595/MUM/2014

(51) Int. Cl.
*G06F 17/00* (2006.01)
*G10L 19/018* (2013.01)
*G06F 17/14* (2006.01)

(52) U.S. Cl.
CPC ............ *G10L 19/018* (2013.01); *G06F 17/148* (2013.01)

(58) Field of Classification Search
CPC ................. G10L 19/018; G06T 1/005; G06T 2201/0052; G06T 2201/0065
USPC ..................................... 704/E19.009; 700/94
See application file for complete search history.

(56) References Cited

U.S. PATENT DOCUMENTS

| 2002/0138730 | A1* | 9/2002 | Kim .................... G10L 19/018 713/176 |
| 2009/0125310 | A1 | 5/2009 | Lee et al. |
| 2010/0183190 | A1* | 7/2010 | Ohzeki ................. G06T 1/005 382/100 |
| 2010/0202651 | A1* | 8/2010 | Ohzeki ................. G06T 1/005 382/100 |
| 2014/0005815 | A1 | 1/2014 | Kakkirala et al. |

FOREIGN PATENT DOCUMENTS

| CN | 101290772 A | 10/2008 |
| CN | 102496367 A | 6/2012 |

* cited by examiner

*Primary Examiner* — Joseph Saunders, Jr.
(74) *Attorney, Agent, or Firm* — Robert Plotkin, P.C.

(57) ABSTRACT

A computer implemented system for audio watermarking for providing robust and blind audio watermarking. The system comprises a watermark embedding system wherein an audio signal is divided into audio frames, multi-level District Wavelet Transform (DWT) is applied on each frame, followed by Singular Value Decomposition (SVD) and embedding the watermark, further followed by inverse SVD and inverse DWT to get watermarked audio frames which are combined to generate a watermarked audio signal. The system further comprises watermark extracting detection system wherein the watermarked audio signal which may be attacked and/or modified is divided into watermarked audio frames, multi-level DWT is applied on each watermarked audio frame, followed by SVD, extracting the embedded watermarked, correlating the extracted watermark with pre-stored watermarks, calculating Peak to Sidelobe ratio (PSR) from the correlation coefficient arrays and finally comparing each PSR with a threshold to authenticate the embedded watermark.

9 Claims, 4 Drawing Sheets

COMPUTER IMPLEMENTED SYSTEM FOR AUDIO WATERMARKING

FIELD OF DISCLOSURE

The present disclosure relates to audio watermarking.

BACKGROUND

Watermarking is a process of hiding information/data in a host/carrier signal to protect the signal during communication. Digital watermarking involves modifying physical or electronic media/signal to embed data such as a machine-readable bar code, customer information, a logo, an image, and the like, into the media, for media information security and data access authentication purposes. The media may be modified such that the embedded data is imperceptible or inaudible to a user, and may be detected or extracted through an automated detection or extraction process. Typically, digital watermarking is applied to media signals such as images, audio signals and video signals. However, it may also be applied to other types of media objects, such as documents (for example, through line, word or character shifting), multi-dimensional graphics models, surface textures of objects, and the like.

Digital watermarking typically involves embedding a watermark in a host media signal, and detecting and reading the embedded watermark from a signal suspected of containing the watermark. The watermark is embedded by altering the host media signal. Generally, random sequences, logos, images, and the like, are used as watermark during embedding processes to watermark host signals. A suspected watermarked signal is analyzed by comparing the exactness or near exactness of the embedded watermark to detect the presence of the watermark and read the watermark.

The watermarked signals in the course of communication may be subjected to various types of intentional distortions, unintentional distortions, signal processing and cryptographic alterations, and the like. Media pirates may also try to eliminate the watermark from the watermarked signal by manipulating the host media including audio, video, image, computer readable medium, compact disc (CD), hard disk, floppy drive, virtual documents, and the like. This is commonly referred to as attacking the watermarked signal.

Precise watermark detection particularly for commercially distributed media such as audio, video, game, and the like, would enable in ascertaining the type, strength and coverage of manipulation and location of the attack.

Thus there exists a need to have a robust system for embedding a watermark in a host signal for preventing possible attacks and detecting the watermark in a watermarked signal that might have been subjected to various types of attacks.

OBJECTS

Some of the objects of the present disclosure aimed to ameliorate one or more problems of the prior art or to at least provide a useful alternative are listed herein below.

An object of the present disclosure is to provide a system for audio watermarking that effectively embeds a watermark in a host audio signal.

Another object of the present disclosure is to provide a system for audio watermarking that is robust and prevents possible attacks on a watermarked audio signal.

Another object of the present disclosure is to provide a system for audio watermarking that precisely detects a watermark in a watermarked audio signal that may have been subjected to attacks.

Another object of the present disclosure is to provide a system for audio watermarking that enables watermark detection in a watermarked audio signal without the original host audio signal.

Another object of the present disclosure is to provide a system for audio watermarking that makes a watermark in the watermarked audio signal in-audible.

Other objects and advantages of the present disclosure will be more apparent from the following description when read in conjunction with the accompanying figures, which are not intended to limit the scope of the present disclosure.

SUMMARY

In accordance with an aspect of the present disclosure, there is provided a computer implemented system for audio watermarking, the system comprising:
  a watermark embedding system for embedding a watermark in an audio signal, the watermark embedding system comprising:
    a first dividing module adapted to divide an audio signal into a plurality of audio frames, each frame being of pre-determined size and having a pre-determined number of samples of the audio signal;
    a first transforming module adapted to apply multi-level Discrete Wavelet Transform (DWT) on each frame to generate detailed coefficients and approximation coefficients at each level;
    a first arranging module adapted to arrange the generated detailed coefficients from all levels of DWT to form a matrix of detailed coefficients;
    a first decomposing module adapted to apply Singular Vector Decomposition (SVD) on the matrix of detailed coefficients to factor the matrix into at least a diagonal matrix;
    an embedding module adapted to embed a watermark bit with a scaling factor to a second Eigen value from top left to bottom right of the diagonal matrix to generate a modified diagonal matrix;
    a second decomposing module adapted to apply inverse SVD on at least the modified diagonal matrix to produce modified detailed coefficients;
    a second transforming module adapted to apply multi-level inverse DWT on the modified detailed coefficients and the generated approximation coefficients to create a watermarked audio frame; and
    a combining module adapted to combine each watermarked audio frame sequentially to produce a watermarked audio signal; and
  a watermark detection system for detecting the watermark from the watermarked audio signal, the watermark detection system comprising:
    a synchronization module adapted to determine a synchronization point in the watermarked audio signal;
    a second dividing module adapted to divide the watermarked audio signal into a plurality of watermarked audio frames, each watermarked audio frame being of pre-determined size and having a pre-determined number of samples of the watermarked audio signal;
    a third transforming module adapted to apply multi-level DWT on each watermarked audio frame to generate watermarked detailed coefficients and watermarked approximation coefficients at each level;
    a second arranging module adapted to arrange the watermarked detailed coefficients from all levels of DWT to form a watermarked matrix of detailed coefficients;

a third decomposing module adapted to apply SVD on the watermarked matrix of detailed coefficients to factor the watermarked matrix into at least a watermarked diagonal matrix;

a detection module adapted to collect a second Eigen value of the watermarked diagonal matrix and storing the collected second Eigen value in an array;

a correlation module adapted to correlate all the collected second Eigen values stored in the array with all watermarks pre-stored in a repository to generate correlated arrays proportionate to the watermarks pre-stored in the repository;

a calculation module adapted to calculate Peak to Sidelobe Ratio (PSR) from each correlation array; and a comparison module adapted to compare each calculated PSR with a pre-determined threshold to authenticate the embedded watermark.

Typically, at least four levels of DWT are applied on each frame.

Additionally, the embedding module is further adapted to update at least an Eigen value in a diagonal of the diagonal matrix, by the watermark bit with the scaling factor to generate the modified diagonal matrix.

Typically, at least four levels of inverse DWT are applied.

Typically, at least four levels of multi-level DWT are applied on each watermarked audio frame.

In accordance with another aspect of the present disclosure, there is provided a computer implemented method for audio watermarking, the method comprising the following steps:

embedding a watermark in an audio signal, wherein the step of embedding the watermark comprises the following steps:

dividing an audio signal into a plurality of audio frames, each frame being of pre-determined size and having a pre-determined number of samples of said audio signal;

applying multi-level Discrete Wavelet Transform (DWT) on each frame to generate detailed coefficients and approximation coefficients at each level;

arranging the generated detailed coefficients from all levels of DWT to form a matrix of detailed coefficients;

applying Singular Vector Decomposition (SVD) on the matrix of detailed coefficients to factor the matrix into at least a diagonal matrix;

embedding a watermark bit with a scaling factor to a second Eigen value from top left to bottom right of the diagonal matrix to generate a modified diagonal matrix;

applying inverse SVD on at least the modified diagonal matrix to produce modified detailed coefficients;

applying multi-level inverse DWT on the modified detailed coefficients and the generated approximation coefficients to create a watermarked audio frame; and combining each watermarked audio frame sequentially to produce a watermarked audio signal; and detecting the watermark from the watermarked audio signal, wherein the step of detecting the watermark comprises the following steps:

determining a synchronization point in the watermarked audio signal;

dividing the watermarked audio signal into a plurality of watermarked audio frames, each watermarked audio frame being of pre-determined size and having a pre-determined number of samples of the watermarked audio signal;

applying multi-level DWT on each watermarked audio frame to generate watermarked detailed coefficients and watermarked approximation coefficients at each level;

arranging the watermarked detailed coefficients from all levels of DWT to form a watermarked matrix of detailed coefficients;

applying SVD on the watermarked matrix of detailed coefficients to factor the watermarked matrix into at least a watermarked diagonal matrix;

collecting a second Eigen value of the watermarked diagonal matrix and storing the collected second Eigen value in an array;

correlating all the collected second Eigen values stored in said array with all watermarks pre-stored in the repository to generate correlated arrays proportionate to the watermarks pre-stored in the repository;

a calculation module computes Peak to Sidelobe Ratio (PSR) from each correlation output; and a comparison module adapted to compare each calculated PSR with a pre-determined threshold to authenticate the embedded watermark.

Typically, the step of applying of inverse SVD includes the step of combining the modified diagonal matrix with a left singular vector matrix and a right singular vector matrix; wherein the application of SVD on the matrix of detailed coefficients further factors said matrix into the left singular vector matrix and the right singular vector matrix.

BRIEF DESCRIPTION OF ACCOMPANYING DRAWINGS

The system for audio watermarking of the present disclosure will now be described with the help of the accompanying drawings, in which.

DETAILED DESCRIPTION

Digital watermarking involves modifying a host signal, typically a media signal to embed information/data such as a machine-readable bar code, a logo, an image, and the like, into the signal, wherein the embedded information is imperceptible or inaudible to a user and thereby secure the signal. However, watermarked signals during the course of communication may be subjected to various types of attacks such as intentional distortions, unintentional distortions, signal processing such as compression and changing the signal sampling rate and/or the combinations of such attacks. Media content such as audio signals vulnerable to such attacks lead to media piracy.

Thus to overcome these aforementioned limitations, the present disclosure envisages a system for audio watermarking that effectively embeds a watermark in an audio signal and enables precise detection of an embedded watermark from a watermarked audio signal.

The system for audio watermarking the present disclosure will now be described with reference to the embodiments shown in the accompanying drawings. The embodiments do not limit the scope and ambit of the disclosure. The description relates purely to the examples and preferred embodiments of the disclosed tool and its suggested applications.

The system herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The system for audio watermarking of the present disclosure is a blind audio watermarking system based on Discrete Wavelet Transform (DWT) and Singular Value Decomposition (SVD) typically implemented on a computer. The system for audio watermarking comprises a watermark embedding system for embedding a watermark in an audio signal to generate a watermarked audio signal and a watermark detection system for detecting the watermark from the watermarked audio signal.

Figure 1:
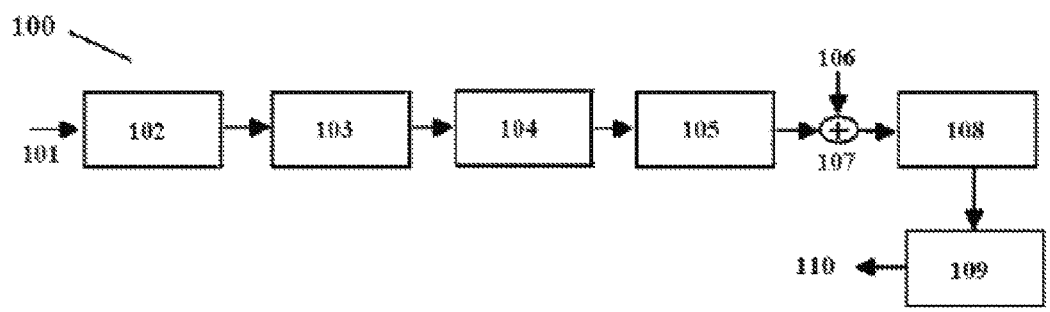
FIG. 1 illustrates a watermark embedding system of the system for audio watermarking of present disclosure.

Referring to FIG. 1, the watermark embedding system of the system for audio watermarking of present disclosure is illustrated. The watermark embedding system 100 comprises a first dividing module 102, a first transforming module 103, a first arranging module 104, a first decomposing module 105, an embedding module 107, a second decomposing module 108 and a second transforming module 109. The watermark is embedded in an audio 101 signal. In accordance with one embodiment, the audio signal 101 is a .wav file. The audio signal 101 is provided to the dividing module 102 wherein the audio signal is divided into multiple audio frames with each frame having a pre-determined size and a pre-determined number of samples therein. The number of samples per frame can be optionally increased/decreased. In accordance with one embodiment, each frame includes 12000 samples to accommodate more number of watermark bits. Each watermark bit is embedded into one frame. After the audio signal 101 is divided into multiple frames, each frame is provided to the first transforming module 103 wherein multi-level Discrete Wavelet Transform (DWT) is applied on each frame by the first transforming module 103. In accordance with one embodiment four levels of DWT are applied on each frame by the first transforming module 103. The number of DWT levels may vary depending upon the frame size. Each audio frame is input to first DWT level, to generate first set of detailed coefficients and first set of approximation coefficients from the input audio frame. The first set of approximation coefficients are then provided to second DWT level which further generates second set of detailed coefficients and second set of approximation coefficients. The second set of approximation coefficients are then provided to third DWT level and so on. All the detailed coefficients generated from each DWT level are then provided to the arranging module 104 which arranges the detailed coefficients from all the DWT levels to form a matrix as shown herein below, wherein, CD1 is the detailed coefficients from first DWT level and CD2, CD3, and CD4 are generated from second DWT level, third DWT level, and fourth DWT level respectively. Each level forms a row of the matrix, and as only a small number of detailed coefficients are available at the lower levels, they are repeated to fill the entire row.

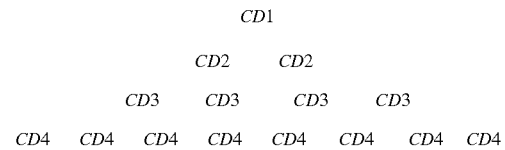

The size of CD1 is half of input audio frame size, the size of CD2 is half of CD1, the size of CD3 is half of CD2 and the size of CD4 is half of CD3. The size of the formed matrix is number of DWT levels by the number of samples in an audio frame. Thus in accordance with the aforementioned embodiment, the size of the matrix is 4×12000.

Thereafter, the matrix of the detailed coefficients is provided to the first decomposing module 105 wherein Singular Value Decomposition (SVD) is applied on the matrix of the detailed coefficients. The SVD operation factors the matrix into three matrices, a left singular vector matrix, a diagonal matrix (D) and a right singular vector matrix. The diagonal matrix comprises singular values/Eigen values as its diagonal components and its size is number of DWT levels by number of DWT levels. Thus in accordance with the aforementioned embodiment, the size of the diagonal matrix is 4×4 and the diagonal matrix contains four singular values as its diagonal elements, referred to as S1, S2, S3 and S4 as shown herein below.

$$\begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix}$$

These Eigen/singular values are used by the embedding module 107 to embed a watermark bit of a watermark 106 and modify the diagonal matrix by updating the second singular value. Typically, the watermark is made from unique random binary bits, a bar code, a logo, and the like. The watermark 106 is converted into a one dimensional vector if the watermark 106 is two dimensional matrix such as a logo or a bar code. The resultant one dimensional vector is converted into bipolar form of 1's and −1's, wherein 1's represents 1's of the watermark and −1's represents 0's of the watermark. The embedding module 107 updates S2 based on the watermark bit as shown below, $$S2 = alpha1*(S2) + alpha2*wmbit$$

wherein, wmbit represents one bit of watermark, alpha1 represents scaling factor one and alpha2 represents scaling factor two. The values of alpha1 and alpha2 are chosen as 1 and 2 respectively. Typically, the values of alpha1 and alpha2 are chosen depending on robustness requirement. This generates a modified diagonal matrix having modified value of S2.

The modified diagonal matrix is then provided to the second decomposing module 108 that performs inverse SVD is on the modified diagonal matrix by combining the modified diagonal matrix, left singular vector matrix and right singular vector matrix to get a modified detailed coefficient matrix as shown herein below. The modified detailed coefficient matrix has modified detailed coefficients mCD1, mCD2, mCD3 and mCD4, wherein mCD1, mCD2, mCD3, and mCD4 are modified detailed coefficients of CD1, CD2, CD3, and CD4 respectively.

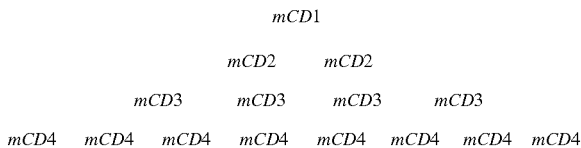

Thereafter, these modified detailed coefficients are provided to the second transforming module 109 which applies multi-level inverse DWT on the modified detailed coefficients and approximation coefficients generated from the four DWT levels. In accordance with the aforementioned embodiment, four levels of inverse DWT are applied the second transforming module 109 to create a watermarked audio frame 110.

Each frame of the audio signal is processed by the watermark embedding system 100 until all the watermark bits are completed. For remaining frames, the watermark can be repeated until all the frames of input audio signal are completed. The watermark embedding system 100 produces equivalent number of watermarked audio frames 110 as the audio signal frames. Finally, all the watermarked audio frames 110 are combined in a sequence to produce a watermarked audio signal.

Figure 2:
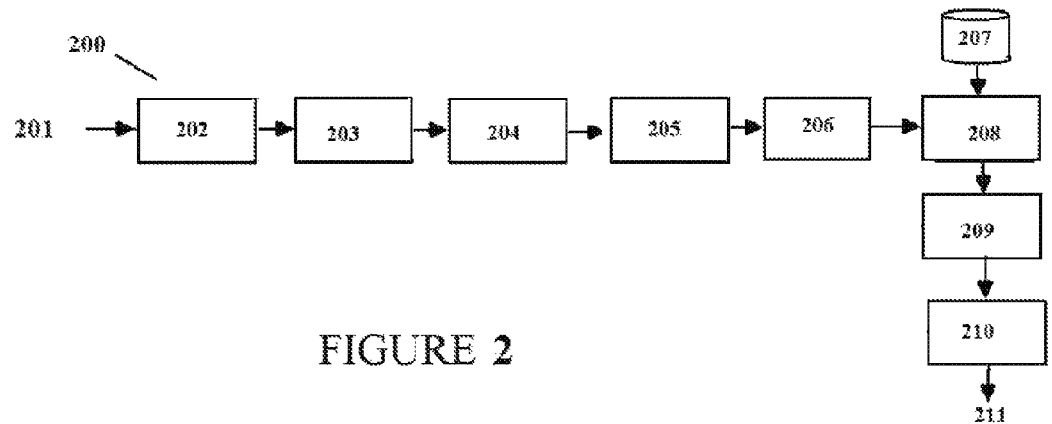
FIG. 2 illustrates a watermark detection system of the system for audio watermarking of present disclosure.

Referring to FIG. 2, a watermark detection system of the system for audio watermarking of present disclosure is illustrated. The watermark detection system 200 comprises a second dividing module 202, a third transforming module 203, a second arranging module 204, a third decomposing module 205, an extracting module 206, a repository 207 containing pre-stored watermarks, a correlation module 208, a calculation module 209 and a comparison module 210, which produces output signal 211. Watermarked audio signal 201 may be an attacked or a modified watermarked audio signal. The watermarked audio signal 201 is provided to the second dividing module 202 wherein the watermarked audio signal 201 is divided into multiple watermarked audio frames with each frame having a pre-determined size and a pre-determined number of samples therein. After the watermarked audio signal 201 is divided into multiple watermarked audio frames, each frame is provided to the third transforming module 203 wherein multi-level DWT is applied on each watermarked audio frame by the third transforming module 203. In accordance with the aforementioned embodiment four levels of DWT are applied on each watermarked audio frame by the third transforming module 203. The number of DWT levels may vary depending upon the watermarked audio frame size. Each watermarked audio frame is input to first DWT level, to generate first set of watermarked detailed coefficients and first set of watermarked approximation coefficients from the input watermarked audio frame. The first set of approximation coefficients are then provided to second DWT level which further generates second set of watermarked detailed coefficients and second set of watermarked approximation coefficients. The second set of watermarked approximation coefficients are then provided to third DWT level and so on. All the watermarked detailed coefficients generated from each DWT level are then provided to the second arranging module 204 which arranges the watermarked detailed coefficients from all the levels of DWT to form a watermarked matrix.

Thereafter, the watermarked matrix of the watermarked detailed coefficients is provided to the third decomposing module 305 wherein SVD is applied on the watermarked matrix of the watermarked detailed coefficients. The SVD operation factors the watermarked matrix into three matrices, a watermarked left singular vector matrix, a watermarked diagonal matrix (WD) and a watermarked right singular vector matrix.

The size of the watermarked diagonal matrix (WD) is number of DWT levels by number of DWT levels and in accordance with the aforementioned embodiment the size of the watermarked diagonal matrix is 4×4 and the watermarked diagonal matrix has four watermarked singular values/Eigen values as its diagonal elements, referred to as WS1, WS2, WS3 and WS4 as shown herein below.

$$\begin{bmatrix} WS_1 & 0 & 0 & 0 \\ 0 & WS_2 & 0 & 0 \\ 0 & 0 & WS_3 & 0 \\ 0 & 0 & 0 & WS_4 \end{bmatrix}$$

From these four watermarked singular values, the singular value to which watermark bit is added is selected. Thus, in accordance with the aforementioned embodiment, the watermarked singular value WS2 is collected by the extracting module 206 and stored in an array. Similarly, this process will be repeated for all the watermarked audio frames of the attacked or watermarked audio signal. All the watermarked singular values of all the watermarked audio frames are stored in the array by the extracting module 206.

Thus, if there are 'n' selected watermarked singular values from 'n' watermarked audio frames to which 'n' watermark bits were added, then all the 'n' watermarked singular values are stored in an array as given below.

$$SV=[WS2F1, WS2F2 \ldots WS2Fn]$$

wherein WS2F1, WS2F2, WS2Fn are the selected watermarked singular values from F1, F2 and Fn frames respectively, and SV is the vector having the collected watermarked singular values.

Thereafter, the correlation module 208 correlates all the watermarked singular values stored in the array SV with all the available watermarks pre-stored in the repository 207 to generate correlated arrays equivalent to the number of watermarks pre-stored in the repository 207.

Thereupon, the correlation arrays are provided to the calculation module 209 wherein Peak to Side Lobe Ratios (PSRs) are calculated from all the correlation arrays to produce PSR values equivalent to the number of watermarks pre-stored in the repository 207. Each PSR is a positive scalar value. The resulting calculated PSRs are then provided to the comparison module 201 wherein the PSRs are compared with a threshold value to authenticate the embedded watermark. The authentication is positive if a particular PSR is greater than the threshold and thereby the corresponding pre-stored watermark in the repository is the suspected watermark or can be confirmed as the corresponding embedded watermark of a suspected customer which can be used further.

Thus the method for audio watermarking, typically implemented on a computer, comprises the following steps:
  embedding a watermark in an audio signal, wherein the step of embedding the watermark comprises the following steps:
    dividing an audio signal into a plurality of audio frames, each frame being of pre-determined size and having a pre-determined number of samples of said audio signal;
    applying multi-level Discrete Wavelet Transform (DWT) on each frame to generate detailed coefficients and approximation coefficients at each level;

arranging the generated detailed coefficients from all levels of DWT to form a matrix of detailed coefficients;

applying Singular Vector Decomposition (SVD) on the matrix of detailed coefficients to factor the matrix into at least a diagonal matrix;

embedding a watermark bit with a scaling factor to a second Eigen value from top left to bottom right of the diagonal matrix to generate a modified diagonal matrix;

applying inverse SVD on at least the modified diagonal matrix to produce modified detailed coefficients;

applying multi-level inverse DWT on the modified detailed coefficients and the generated approximation coefficients to create a watermarked audio frame; and combining each watermarked audio frame sequentially to produce a watermarked audio signal; and detecting the watermark from the watermarked audio signal, wherein the step of detecting the watermark comprises the following steps:

determining a synchronization point in the watermarked audio signal;

dividing the watermarked audio signal into a plurality of watermarked audio frames, each watermarked audio frame being of pre-determined size and having a pre-determined number of samples of the watermarked audio signal;

applying multi-level DWT on each watermarked audio frame to generate watermarked detailed coefficients and watermarked approximation coefficients at each level;

arranging the watermarked detailed coefficients from all levels of DWT to form a watermarked matrix of detailed coefficients;

applying SVD on the watermarked matrix of detailed coefficients to factor the watermarked matrix into at least a watermarked diagonal matrix;

collecting a second Eigen value of the watermarked diagonal matrix and storing the collected second Eigen value in an array;

correlating all the collected second Eigen values stored in said array with all watermarks pre-stored in the repository to generate correlated arrays proportionate to the watermarks pre-stored in the repository;

a calculation module computes Peak to Sidelobe Ratio (PSR) from each correlation output; and a comparison module adapted to compare each calculated PSR with a pre-determined threshold to authenticate the embedded watermark.

Figure 3A:
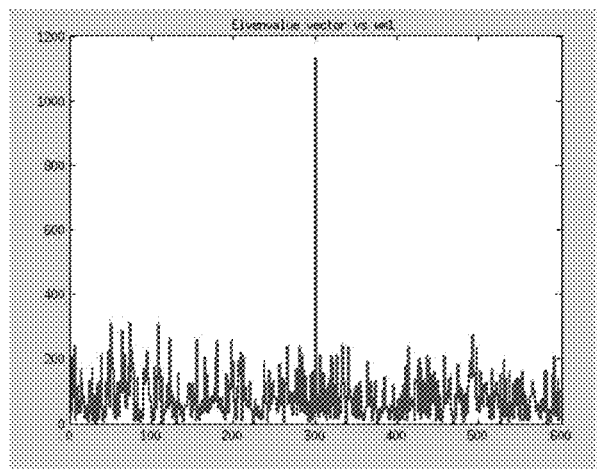
FIGS. 3a and 3b, illustrate graphical representations of an exemplary embodiment of the system for audio watermarking of the present disclosure.
Figure 3B:
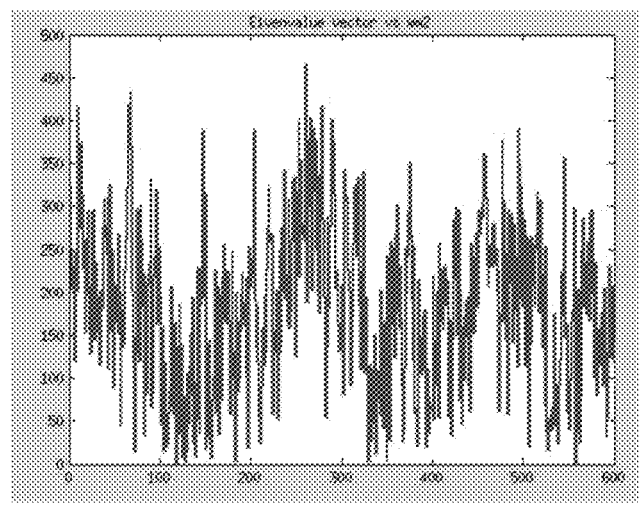

Referring to FIGS. 3a and 3b, graphical representations of an exemplary embodiment of the system for audio watermarking of the present disclosure are illustrated. A watermark having a random sequence of size 600 bits is translated into a bipolar form. An input audio of .wav format containing both music and voice with sampling rate 44100 and duration of 3 minutes 25 seconds is used. The audio signal is divided into audio frames wherein 12000 samples are included per frame, whereby the audio signal is divided into at least 600 frames to accommodate 600 watermark bits. The audio frames are watermarked by the watermark embedding system 100.

Watermarking is done in .wav format and the watermark detection and extraction is also done in .wav format. The watermark is detected by the watermark detection system 200. Probable attacks to the watermarked audio signal are change of bit rate, compression type and sampling rate and addition of noise.

Two random sequences are considered as watermarks wm1, wm2 of 600 bits of size each. FIG. 3 shows the correlation peak between Eigen value vectors of watermarked audio and watermark bits when wm1 is embedded and correlation was calculated using two watermarks with eigen-value vectors of watermarked audio.

Figure 4A:
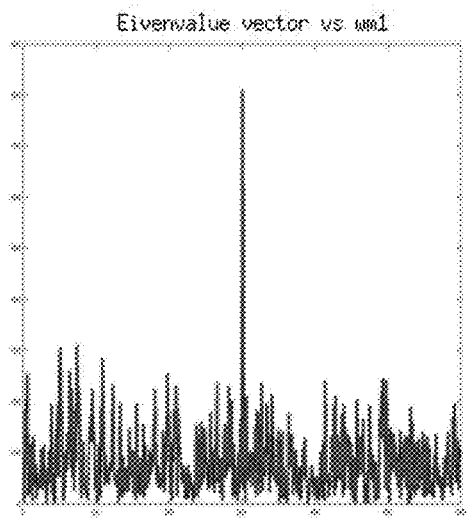
FIGS. 4a and 4b, illustrate graphical representations of another exemplary embodiment of the system for audio watermarking of the present disclosure.
Figure 4B:
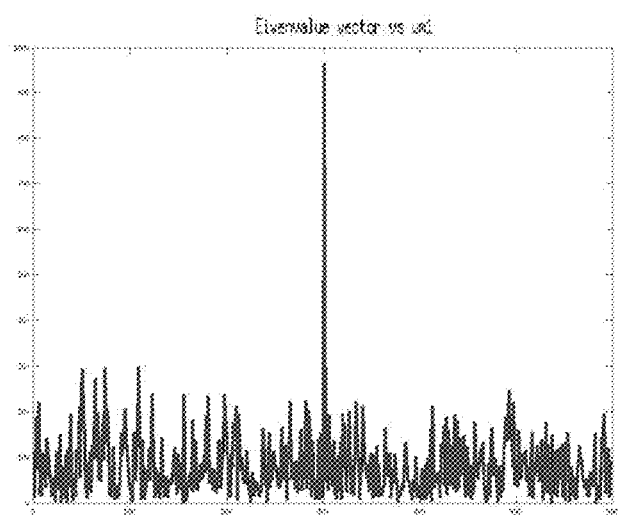

Referring to FIGS. 4a and 4b, graphical representations of another exemplary embodiment of the system for audio watermarking of the present disclosure are illustrated. The system of present disclosure was tested by changing the compression type with different bit rates, sampling rates and also tested by adding random noise, brum attack, and sinus attack. The system of the present disclosure is robust against all these attacks. FIGS. 4a and 4b illustrate the robustness of the system against mp3 compression with 64 kbps bit rate and AAC compression with 64 kbps bit rates.

The system for audio watermarking of the present disclosure is a robust system that effectively camouflages a watermark and further enables ascertaining type, strength and coverage of manipulation and location of any attack on a watermarked audio signal. The system for audio watermarking of the present disclosure can be implemented in number of applications of Information Security and Digital Watermarking such as digital copyrights management, multimedia security, and the like.

Technical Advancements and Economic Significance

The technical advancements offered by the system for audio watermarking of the present disclosure includes the realization of:

effectively embedding a watermark in a host audio signal;

preventing possible attacks on a watermarked audio signal;

precisely detecting a watermark in a watermarked audio signal that may have been subjected to attacks;

enabling watermark detection in a watermarked audio signal without the original host audio signal;

making a watermark in the watermarked audio signal inaudible.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer implemented system for audio watermarking, said system comprising:
    a watermark embedding system for embedding a watermark in an audio signal, said watermark embedding system comprising:
        a first dividing module adapted to divide an audio signal into a plurality of audio frames, each frame being of pre-determined size and having a pre-determined number of samples of said audio signal;
        a first transforming module adapted to apply multi-level Discrete Wavelet Transform (DWT) on each frame to generate detailed coefficients and approximation coefficients at each level;
        a first arranging module adapted to arrange the generated detailed coefficients from all levels of DWT to form a matrix of detailed coefficients;
        a first decomposing module adapted to apply Singular Vector Decomposition (SVD) on said matrix of detailed coefficients to factor said matrix into at least a diagonal matrix;
        an embedding module adapted to embed a watermark bit with a scaling factor to a second Eigen value from top left to bottom right of said diagonal matrix to generate a modified diagonal matrix;
        a second decomposing module adapted to apply inverse SVD on at least said modified diagonal matrix to produce modified detailed coefficients;
        a second transforming module adapted to apply multi-level inverse DWT on the modified detailed coefficients and the generated approximation coefficients to create a watermarked audio frame; and
        a combining module adapted to combine each watermarked audio frame sequentially to produce a watermarked audio signal; and
    a watermark detection system for detecting the watermark from the watermarked audio signal, said watermark detecting system comprising:
        a synchronization module adapted to determine a synchronization point in the watermarked audio signal;
        a second dividing module adapted to divide the watermarked audio signal into a plurality of watermarked audio frames, each watermarked audio frame being of pre-determined size and having a pre-determined number of samples of the watermarked audio signal;
        a third transforming module adapted to apply multi-level DWT on each watermarked audio frame to generate watermarked detailed coefficients and watermarked approximation coefficients at each level;
        a second arranging module adapted to arrange the watermarked detailed coefficients from all levels of DWT to form a watermarked matrix of detailed coefficients;
        a third decomposing module adapted to apply SVD on said watermarked matrix of detailed coefficients to factor said watermarked matrix into at least a watermarked diagonal matrix;
        a detection module adapted to collect a second Eigen value of said watermarked diagonal matrix and storing the collected second Eigen value in an array;

a correlation module adapted to correlate all the collected second Eigen values stored in said array with all watermarks pre-stored in the repository to generate correlated arrays proportionate to the watermarks pre-stored in the repository;

a calculation module computes Peak to Sidelobe Ratio (PSR) from each correlation output; and a comparison module adapted to compare each calculated PSR with a pre-determined threshold to authenticate the embedded watermark.

2. The system as claimed in claim 1, wherein at least four levels of DWT are applied on each frame.

3. The system as claimed in claim 1, said embedding module is further adapted to update at least an Eigen value in a diagonal of said diagonal matrix, by the watermark bit with the scaling factor to generate the modified diagonal matrix.

4. The system as claimed in claim 1, wherein said second Eigen value is the second highest singular value from top left to bottom right of said diagonal matrix.

5. The system as claimed in claim 1, wherein said watermark is selected from the group consisting of a unique random sequence, a binary logo and unique customer id.

6. The system as claimed in claim 1, wherein at least four levels of inverse DWT are applied.

7. The system as claimed in claim 1, wherein at least four levels of multi-level DWT are applied on each watermarked audio frame.

8. A computer implemented method for audio watermarking, said method comprising the following steps:

embedding a watermark in an audio signal, wherein the step of embedding the watermark comprises the following steps:

dividing an audio signal into a plurality of audio frames, each frame being of pre-determined size and having a pre-determined number of samples of said audio signal;

applying multi-level Discrete Wavelet Transform (DWT) on each frame to generate detailed coefficients and approximation coefficients at each level;

arranging the generated detailed coefficients from all levels of DWT to form a matrix of detailed coefficients;

applying Singular Vector Decomposition (SVD) on the matrix of detailed coefficients to factor the matrix into at least a diagonal matrix;

embedding a watermark bit with a scaling factor to a second Eigen value from top left to bottom right of the diagonal matrix to generate a modified diagonal matrix;

applying inverse SVD on at least the modified diagonal matrix to produce modified detailed coefficients;

applying multi-level inverse DWT on the modified detailed coefficients and the generated approximation coefficients to create a watermarked audio frame; and combining each watermarked audio frame sequentially to produce a watermarked audio signal; and detecting the watermark from the watermarked audio signal, wherein the step of detecting the watermark comprises the following steps:

determining a synchronization point in the watermarked audio signal;

dividing the watermarked audio signal into a plurality of watermarked audio frames, each watermarked audio frame being of pre-determined size and having a pre-determined number of samples of the watermarked audio signal;

applying multi-level DWT on each watermarked audio frame to generate watermarked detailed coefficients and watermarked approximation coefficients at each level;

arranging the watermarked detailed coefficients from all levels of DWT to form a watermarked matrix of detailed coefficients;

applying SVD on the watermarked matrix of detailed coefficients to factor the watermarked matrix into at least a watermarked diagonal matrix;

collecting a second Eigen value of the watermarked diagonal matrix and storing the collected second Eigen value in an array;

correlating all the collected second Eigen values stored in said array with all watermarks pre-stored in the repository to generate correlated arrays proportionate to the watermarks pre-stored in the repository;

a calculation module computes Peak to Sidelobe Ratio (PSR) from each correlation output; and a comparison module adapted to compare each calculated PSR with a pre-determined threshold to authenticate the embedded watermark.

9. The method as claimed in claim 8, wherein the step of applying of inverse SVD includes the step of combining the modified diagonal matrix with a left singular vector matrix and a right singular vector matrix; wherein the application of SVD on the matrix of detailed coefficients further factors said matrix into the left singular vector matrix and the right singular vector matrix.

\* \* \* \* \*